2,962,505
Patented Nov. 29, 1960

2,962,505

PROCESS OF STABILIZING 2-p-DIOXANONE

Herman S. Schultz, Easton, Pa., assignor to General Aniline & Film Corporation, New York, N.Y., a corporation of Delaware No Drawing. Filed Oct. 22, 1959, Ser. No. 847,893

2 Claims. (Cl. 260—340.6)

The present invention relates to a process for stabilizing 2-p-dioxanone.

It is well known that 2-p-dioxanone has a strong tendency to polymerize on standing a relatively short time at room temperature or higher even in the absence of any added catalytic material. The time can be as little as a few days and is unpredictable even after careful purification by fractionation. The time is always less than the duration which would make it practical to use as a readily handled article of commerce without special precautions. It is known that 2-p-dioxanone can be preserved in monomeric form for long periods of time by refrigeration under which condition it exists in the solid state (M.P.=27–29° C. for fractionated material).

To provide an improved method for the stabilization of 2-p-dioxanone constitutes the principal object of the present invention.

Other objects and advantages will become more clearly manifest from the following discussion.

The foregoing objects are readily accomplished by contacting small amounts of calcium hydride with 2-p-dioxanone. The amount of calcium hydride added may range from 0.05% to 1.0% by weight of the 2-p-dioxanone.

During the course of my experimentation with the present invention, I have found that very small amounts of acids or bases catalyze polymerization at room temperature or even below room temperature. Even leaving 2-p-dioxanone open to the air will ultimately promote polymerization. It is hypothesized that so-called uncatalyzed polymerization is catalyzed by the formation of traces of hydroxyethoxy acetic acid by the action of moisture (which can be absorbed during ordinary handling) on 2-p-dioxanone. It is apparent from the experimental results described hereinafter that the efficiency of calcium hydride as a stabilizer is due to more than just the removal of traces of moisture. It is hypothesized that calcium hydride reacts with traces of organic acid to form calcium salts which are inactive. There may also be actions not yet determined at the present time. Drying agents of the type of concentrated sulfuric acid or $P_2O_5$ are obviously out of the question since they cause rapid polymerization. However, drying agents of another type described in Example IV, generally considered to be very efficient, are also ineffective as stabilizers.

It is to be noted that the signs of polymerization of 2-p-dioxanone are a rise in the index of refraction accompanied by a visible increase of bulk viscosity eventually resulting in the formation of a cloudiness and then a polymer gel of characteristic appearance. This gel soon turns into a solid of from crumbly to hard consistency. Visual observation of a test sample relative to a control for viscosity changes, and changes of state are crude but effective ways of obtaining a qualitative idea of the effectiveness of inhibitors or stabilizers. Polymerization tendencies can also be followed by precipitation and washing of representative samples with diethyl ether from time to time. Materials as low as dimer and trimer (as shown by molecular weight versus melting point data in R. Leimu and P. Virtonon, Suomen Kemistilehti 16B 4–8 (1943) and comparison to my own experimental data) are precipitated.

The test results obtained from the following examples should be judged relative to the controls for each experiment since absolute results vary from lot to lot of 2-p-dioxanone. Similarly, the temperatures used are generally more drastic than would actually be encountered in ordinary handling so that it can be presumed that the ordinary life of 2-p-dioxanone monomer would be much longer. In the following examples, calcium hydride was used in the form of a fine powder in ¼–1% concentration by weight. However, there is no reason why as little as 0.05% could not be used if the impurities which catalyze the polymerization are present in very small amounts. The use of amounts over 1% calcium hydride as a fine powder would make possible the use of shorter contact times. It was found that a period of agitation promotes contacting and is very advantageous, in view of the heterogeneous nature of the system, for increasing the efficiency of the calcium hydride. Most of the examples below involved shaking the calcium hydride overnight suspended in the 2-p-dioxanone. It was found that beginning with carefully distilled 2-p-dioxanone the calcium hydride mixture could be shaken as high as 100° C. for 16 hours without any change in index of refraction or qualitative infrared hydroxyl absorbance in the $2.88\mu$ region. However, a continuation of this experiment at 130–150° C. resulted in polymerization. The hydroxyl absorbance at $2.88\mu$ represents a small amount of hydroxyl containing impurity, the origin and nature of which is not fully understood at the present time.

It is well known that lower alcohols such as methanol and ethanol react with calcium hydride to form calcium alkoxides and hydrogen. During agitation, vessels should be vented or be able to stand moderate pressure because of the hydrogen evolved. It is advantageous to agitate in the shipping container. There is no reason to believe that calcium hydride could not be used in the form of a bed for some sort of continuous preliminary process or pelleted in a carrier.

I have found that the life of 2-p-dioxanone as a monomer is prolonged if the calcium hydride is left continuously in contact therewith until just before use rather than filtering after the treatment period. It is extremely difficult, if not impossible, to keep out traces of foreign materials during transfer or off the walls of storage vessels. The liquid 2-p-dioxanone can be filtered off just before use and employed directly or redistilled to guarantee the absence of traces of dimer, trimer and perhaps calcium salts.

In order to more fully illustrate the foregoing procedure, the following examples are submitted for further details regarding the process involved.

*Example I*

Three tubes (screw top, polyethylene liner, 40 cc. volume) were charged with 20 grams distilled 2-p-dioxanone $N_D^{25}$ 1.4509. It should be noted that the index of refraction in many cases can be taken a few degrees (about 5°) below the melting point because of supercooling and slow crystallization from the supercooled liquid in this temperature range. 0.20 gram of calcium hydride (1%) was charged to two of these and the third was used as a control. Dry box handling techniques to keep out moisture was used throughout. The dry box was essentially an enclosed space with a dry nitrogen atmosphere in which all manipulations were carried out. The tubes were shaken overnight with the temperature rising no higher than 45° C. (due to heat from shaker). The next morning the tubes were placed into an oven kept at 52–60° C. The tubes were removed every other day, allowed to cool rapidly to room temperature, and observed for any signs of change such as thickening, cloudiness, and gel formation. They were then reinserted into the oven. The control slowly thickened and showed cloudiness and gel formation in 8–10 days; the range being noted because a weekend intervened. Cloudiness and gel formation come rapidly one upon the other or coincide in most tests. Samples for the data below were collected using dry-box techniques.

| Tube No. | Time, days | Index of Refraction | Results from Diethyl Ether Precipitation |
|---|---|---|---|
| Control | 8–10 | | gelled. |
| 1 | 19 | $n_D^{26}$ 1.4511 | |
|  | 35 | $n_D^{24\frac{1}{2}}$ 1.4529 | <1% precipitate, contains calcium. |
|  | 62 | $n_D^{27\frac{3}{4}}$ 1.4521 | 6¾%, low melting greasy solid. |
| 2 | 69 | $n_D^{26}$ 1.4532 | 10.9%, low melting greasy solid. |

After 74 days, both samples were easy flowing nonviscous liquids at room temperatures by visual inspection. The above table indicates that the gelled control at 8–10 days contains much more diethyl ether precipitable solid than the two tubes containing the calcium hydride at a much longer time.

*Example II*

The experiment was carried out in the same manner as Example I. Tubes of 2-p-dioxanone ($n_D^{26\frac{1}{2}}$ 1.4508) containing 1%, ½%, and ¼% calcium hydride were set up. The control gelled on cooling after 11 days at 60° C. A sample was removed from the 1% tube under dry box conditions at 19 days and showed only a trace of a low melting greasy solid on precipitation with diethyl ether. The $n_D^{24\frac{1}{2}}$ is 1.4515. At 46 days, all the calcium hydride containing tubes appeared the same as at 19 days.

*Example III*

The experiment was set up in the same manner as Example I using the same 2-p-dioxanone as Example II. Two tubes containing 1% calcium hydride and one tube as a control were set up. They were shaken overnight and placed into an oven at 60° C. for two days. The contents of one of the calcium hydride containing tubes was filtered through filter paper in a dry box and then reinserted into the oven. The tubes were examined as before by cooling to room temperature every other day and observing any changes. The control gelled in 18–19 days and the tube given the calcium hydride treatment and then filtered, also gelled in 18–19 days. A sample from the tube which was treated continuously with calcium hydride was precipitated with diethyl ether after 25 days. 2.7% of a solid was precipitated. The index of refraction was $n_D^{27\frac{3}{4}}$ 1.4508. From this and other experiments it was concluded that it is beneficial to leave the 2-p-dioxanone continuously in contact with calcium hydride to eliminate the effect of any fortuitous incorporation of impurities during handling or storage. This experiment also confirms the specific inhibiting effect of calcium hydride.

*Example IV*

The samples in this example were set up and the test run in exactly the same manner at 60° C. as in Example I. A control plus tubes each containing 1% by weight of Drierite (calcium sulfate), magnesium sulfate (anhydrous), barium oxide, magnesium oxide, calcium oxide, and calcium hydride were set up. The control gelled in 27 days. The tubes containing magnesium sulfate, barium oxide and calcium oxide gelled in less than 27 days; the Drierite containing tubes gelled in 29 days and the tube containing magnesium oxide gelled in 34 days. At 41 days a sample $n_D^{29}$ 1.4503 from the calcium hydride tube was precipitated and washed with diethyl ether giving 2.3% recovery. The appearance of the 2-p-dioxanone in the $CaH_2$ tube showed fluidity like pure freshly distilled monomer after 41 days and after 71 days.

From the foregoing examples, it is clearly evident that the process of the present invention enables a manufacturer of 2-p-dioxanone to ship it without the need for refrigerating the product and the requiring of special storage facilities on the part of the customer or consumer. By the process of the present invention, it is possible to ship 2-p-dioxanone in liquid form rather than a solid by keeping the temperature just above the melting point (about 30° C.).

I claim:

1. The process of stabilizing 2-p-dioxanone which comprises treating the said dioxanone with a stabilizing amount of calcium hydride at a temperature of about 30° C.

2. The process of stabilizing 2-p-dioxanone which comprises contacting therewith, prior to use, 0.05% to 1.0% by weight of calcium hydride at a temperature of about 30° C.

No references cited.